United States Patent [19]

Kuzma

[11] Patent Number: 4,512,358
[45] Date of Patent: Apr. 23, 1985

[54] COMPACT LONG-LIFE BY-PASS AND PRESSURE UNLOADER VALVE

[75] Inventor: Gregory S. Kuzma, Randolph, N.J.

[73] Assignee: Wm. Steinen Mfg. Co., Parsippany, N.J.

[21] Appl. No.: 526,608

[22] Filed: Aug. 26, 1983

[51] Int. Cl.$^3$ .......................................... G05D 16/10
[52] U.S. Cl. ...................................................... 137/116
[58] Field of Search ................................. 137/115, 116

[56] References Cited

U.S. PATENT DOCUMENTS

| 3,457,941 | 7/1969 | Cook ...................................... 137/116 |
| 4,105,041 | 8/1978 | Axthammer ........................... 137/116 |
| 4,292,990 | 10/1981 | Pareja .................................. 137/115 |

FOREIGN PATENT DOCUMENTS 868601  1/1942  France ............................... 137/116

Primary Examiner—Robert G. Nilson
Attorney, Agent, or Firm—Ostrolenk, Faber, Gerb & Soffen

[57] ABSTRACT

An unloader valve in which the valve body has an inlet opening between an outlet opening and a by-pass opening and in which the flow of fluid is controlled by two valves, both of which open and close in relation to a single unitary plunger. The plunger is hollow from adjacent the inlet opening to the outlet opening so that fluid flows from the inlet opening through the hollow plunger to a check valve and the outlet opening. The plunger is presettably biased to close a by-pass valve between the inlet and by-pass openings, thus regulating the pressure at the outlet opening. The valve also contains an override piston, one surface of which is exposed to the outlet opening. When the output is shut off, the resulting outlet pressure drives this piston against the end of the plunger, and fully opens the by-pass valve to permit the fluid to flow from the inlet to the by-pass opening, thus not only protecting against excessive pressure build-up but also lowering the inlet pressure to a low unloading level. A seal around the plunger moves only incrementally while outlet pressure is regulated and moves under a very low pressure differential. The seal around the piston moves only when the piston is driving the plunger to fully open the by-pass valve or returning with the plunger when the by-pass valve closes, so that its wear is transitional. When the by-pass valve is fully open, neither seal moves. As a result, wear on the seals around the plunger and piston alternates and is minimized, resulting in a compact longlife valve.

13 Claims, 9 Drawing Figures

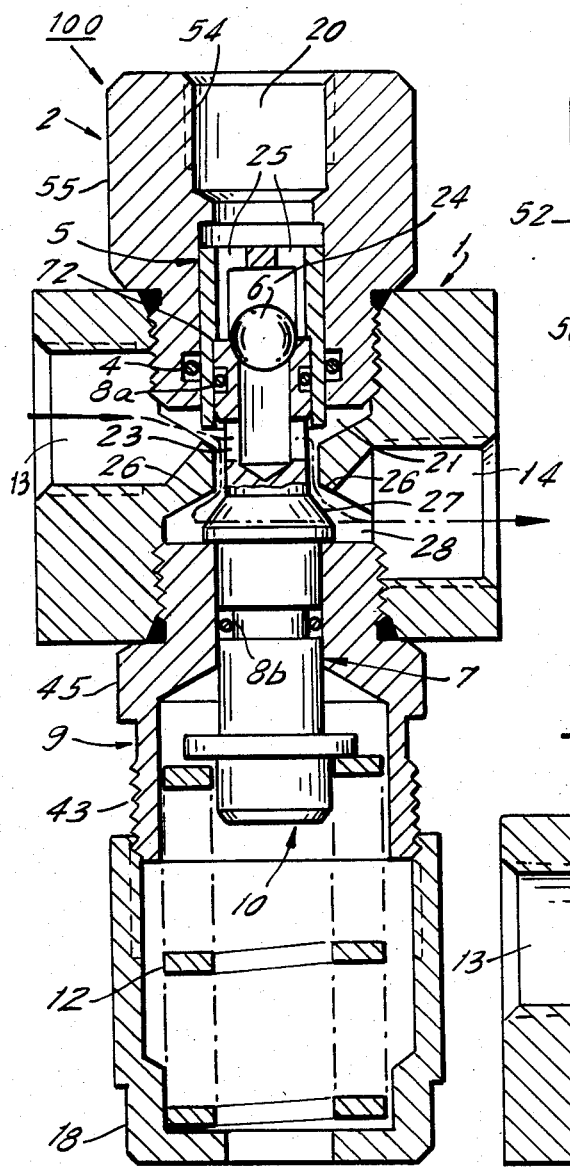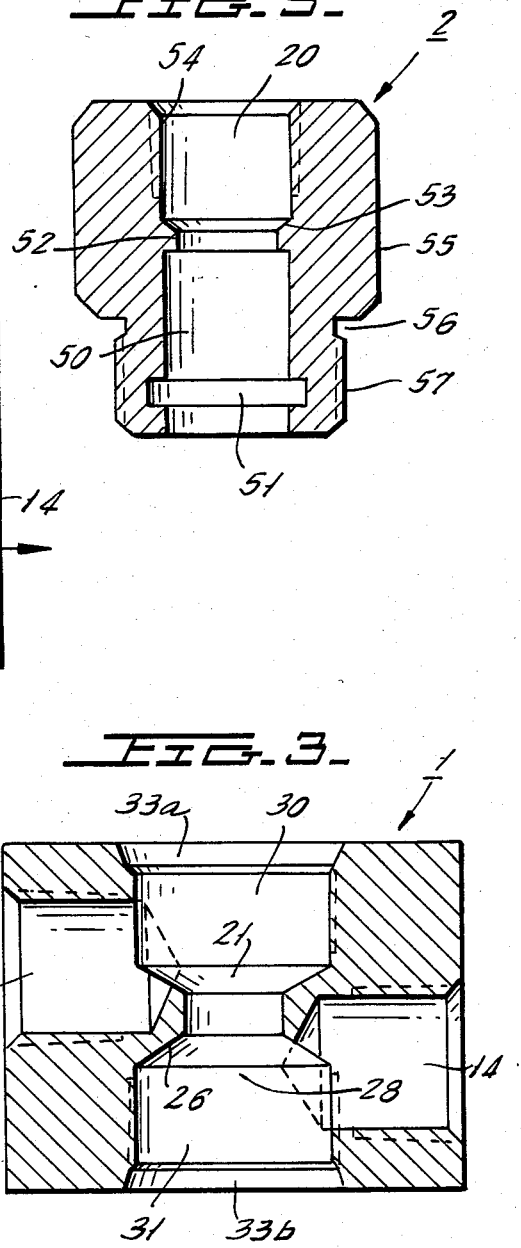

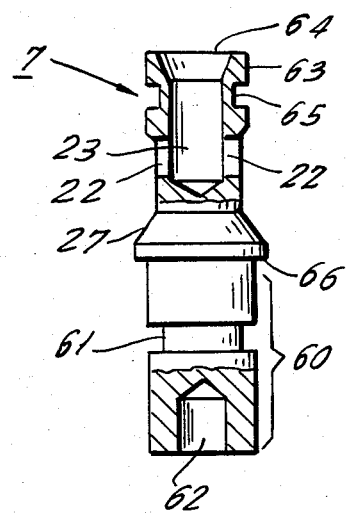
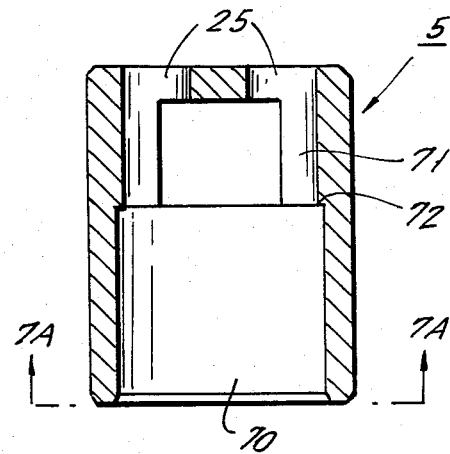
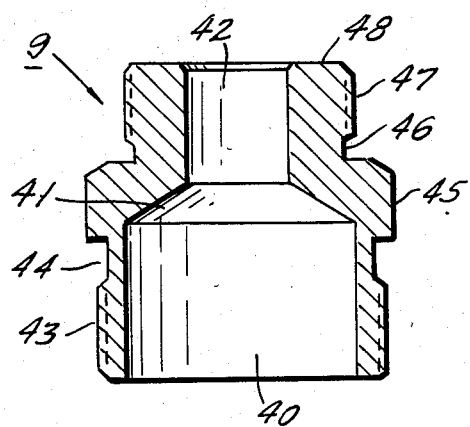
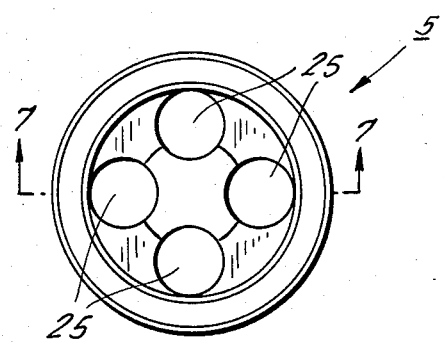

COMPACT LONG-LIFE BY-PASS AND PRESSURE UNLOADER VALVE

BACKGROUND OF THE INVENTION

1. Field of the Invention

This invention relates to a by-pass and pressure unloader valve for use with a positive displacement pump system. It further relates to a valve which serves the functions of regulating pressure when the output is open and shifting to an unloading mode in which inlet presure is low to prevent excessive pressure when output is closed.

2. Description of the Prior Art

An example of a prior art valve for performing as a pressure control and unloader is the "Valve Construction" taught in U.S. Pat. No. 3,157,198, issued Nov. 17, 1964. This prior art valve included a structure with four distinct chambers, two check valves, a diaphragm and a biasing spring, resulting in a complex and inefficient structure.

More recently, improvements have been made on unloader valves. Specifically, the "Pressure Control and Unloader Valve" described in U.S. Pat. No. 3,953,154, issued Apr. 27, 1976, has fewer chambers and uses no distinct diaphragm, resulting in a simpler structure. It also, however, uses a valve assembly including a separate spring-loaded valve assembled from numerous parts at its outlet. This assembly requires a pressure wave to shift into the unloading mode. Finally, a single seal around the valve assembly absorbs all the wear due to movement, including sudden movement due to pressure waves.

Another development in the art is represented by the "High Pressure Unloader Valve" described in U.S. Pat. No. 4,292,990, issued Oct. 6, 1981. That device has a hollow cylindrical tube connecting the inlet and outlet openings. Around the tube is an opening into a by-pass, together with a series of parts which open a valve between the inlet and by-pass openings. This construction similarly uses a large number of moving parts in a relatively complex arrangement. Several seals are used which may be subject to wear.

Therefore, although the prior art teaches valves which perform the functions of regulating pressure and also of relieving sudden high pressure with a by-pass or unloader valve, the prior art valves are relatively complicated, and may be short lived due to seal wear.

SUMMARY OF THE INVENTION

A primary object of the invention is to provide a simple, easy to construct pressure control and unloader valve.

Another object of the invention is to provide an unloader valve in which the number of parts is reduced to a minimum, both to permit simple construction and also to reduce wear. More specifically, an object of the invention is to reduce failure due to movement of parts against each other, specifically the movement of seals.

A further object of the invention is to provide an unloader valve in which the effects of failure are minimized, both by providing parts unlikely to break and by providing fail-safe modes.

A general object of the invention is to provide an unloader valve which protects the pump to which it is connected and other pressurized components from excessive pressure build-up and damage when the output is shut off, whether or not the shut off generates a presure or shock wave. Furthermore, the unloader valve should regulate output pressure at an adjustable preset level and should automatically shift from this regulating function to the by-pass or unloading function by which it not only protects from excessive pressure, but also shifts inlet pressure to a low level.

In general, these and other objects are achieved by providing a novel valve with a hollow movable valve mechanism, with an override piston for moving the movable valve mechanism for unloading, and with two seals between inlet and outlet, one wearing during the pressure regulation operation and the other wearing only during the shifts to or from unloading operation.

More specifically, applicant's invention includes a valve body which has an inlet opening, an outlet opening, and a central chamber. Fluid entering the inlet opening ordinarily comes from a pump, and is therefore under pressure. Inside the central chamber in the valve body is a movable mechanism for permitting the fluid to flow to the outlet opening. This movable mechanism includes a plunger which has a lateral opening into a hollow portion of the plunger which extends from the lateral opening to a centered opening at an end of the plunger facing the outlet opening. The hollow portion of the plunger connects the central chamber with the outlet opening of the valve body, so that fluid can flow from the inlet opening through the hollow portion of the plunger to the outlet. At the outlet end of the hollow portion of the plunger is a check valve which prevents fluid from flowing from the outlet opening toward the inlet opening of the valve body. Around the periphery of the hollow portion of the plunger is a seal which prevents the fluid from flowing around the plunger between the inlet and the outlet openings.

In the preferred embodiment, the valve body also has a by-pass opening, and the plunger functions further to permit the excess fluid to flow out the by-pass opening, either when the outlet pressure exceeds the preset pressure momentarily, or when the outlet pressure suddenly rises, as would happen if the outlet flow were shut off. Between the inlet opening and the by-pass opening is a restricted portion of the valve body, and the plunger is shaped so that it fits against the restricted portion of the valve body, thereby forming a by-pass valve for controlling fluid flow from the inlet opening to the by-pass opening. The plunger is biased so that when the outlet pressure exceeds a preset pressure, the plunger moves to permit some of the inlet fluid to flow through the by-pass valve to the by-pass opening. This operation regulates the outlet pressure.

In the preferred embodiment, the check valve at the outlet end of the hollow portion of the plunger is simply a ball or poppet which seats against the centered opening of the hollow portion of the plunger. The check valve ball or poppet may be held in the closed position by a check valve spring if bias is desired. During pressure regulation operation of the unloader valve, the check valve is open and the plunger moves only incrementally to increase or decrease the opening of the by-pass valve, so that movement of parts is minimal. Furthermore, the plunger, the ball and the seal are unitary parts, so that the construction is extremely simple and breakage is minimized.

In the preferred embodiment, the invention also contains a movable override piston which surrounds the outlet end of the hollow portion of the plunger. The piston provides a cage to prevent the ball from leaving the end of the plunger. Also, the piston fits against the plunger so that when the outlet flow is shut off, the check valve closes and the pressure locked in the outlet line acts on the exposed piston area, causing the piston to engage the plunger. Because the exposed piston area, together with the plunger and ball area, is substantially larger than the plunger area alone, the piston overrides the bias force on the plunger and moves it until the by-pass valve is fully open, permitting unloading operation. Consequently, the inlet pressure drops to a low level, so that the by-pass valve remains fully open and the unloading operation continues due to the difference between outlet and inlet pressure until the outlet is reopened. This unloading operation thus protects the pump and other pressurized components from excessive pressure build-up and also permits the pump to operate at a low pressure level.

As noted above, a seal around the plunger prevents fluid flow between the inlet and outlet openings. During pressure regulation operation, the plunger and plunger seal move only incrementally and the pressure differential across the plunger seal is very low, especially if the check valve is not biased. Therefore, wear on the plunger seal is minimal, resulting in greatly extended seal life.

The preferred embodiment also includes a seal around the override piston, for the same purpose as the seal around the plunger. The override piston, however, is stationary both during pressure regulation and during unloading operation. Therefore, the piston seal wears only when the valve shifts to and from unloading operation, and the seal is under a large pressure differential during only part of each shift. Therefore, piston seal wear is also minimized.

In addition, in the preferred embodiment, there are a plurality of lateral openings in the plunger to permit a free flow of fluid into the hollow portion of the plunger or through the plunger. In addition, the inlet opening is nearly opposite the by-pass opening in the valve body, so that fluid can flow efficiently between the two openings. Also, the plunger is biased by a spring, the compression of the spring being adjustable by turning a spring adjusting nut, thereby determining the preset pressure for the outlet.

These and other features and objects of applicant's invention will become apparent from the drawings, the description of the preferred embodiment and the appended claims.

BRIEF DESCRIPTION OF THE DRAWINGS

FIG. 2B is a cross-sectional view from the same perspective as FIG. 2A, showing the flow of fluid in the unloading mode.

FIG. 3 is a cross-sectional view of the valve body 1 of FIG. 2.

FIG. 4 is a cross-sectional view of the bonnet 9 of FIG. 2.

FIG. 5 is a cross-sectional view of the outlet fitting 2 of FIG. 2.

FIG. 6 is a cross-sectional view of the plunger 7 of FIG. 2.

FIG. 7 is a cross-sectional view of the piston 5 of FIG. 2.

FIG. 7A is an end view of the outlet end of the piston of FIG. 7, taken in the direction of the arrows 7A—7A of FIG. 7.

DETAILED DESCRIPTION OF THE PREFERRED EMBODIMENT

Figure 1:
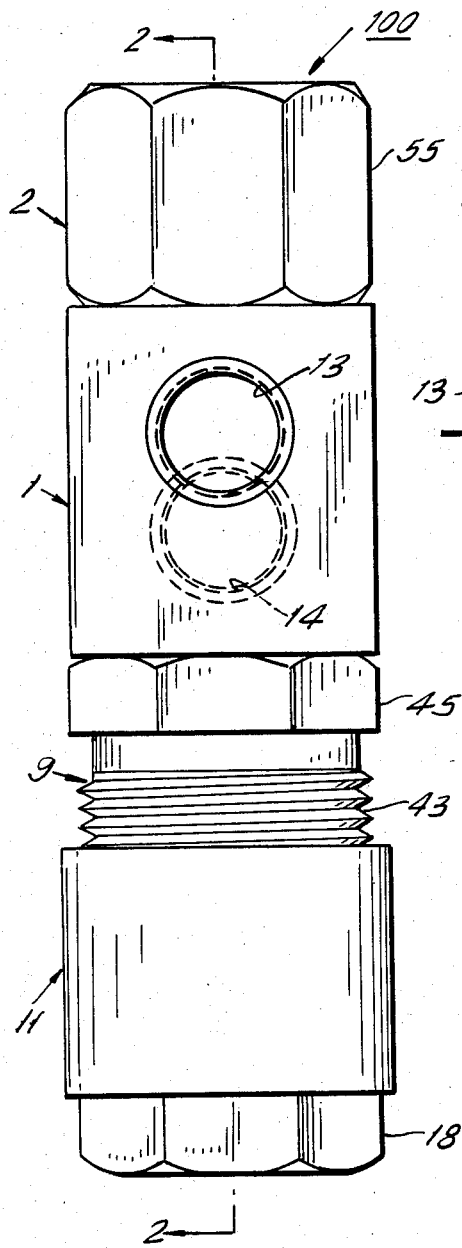
FIG. 1 is a side view of the preferred embodiment of the unloader valve of the invention.
Figure 2A:
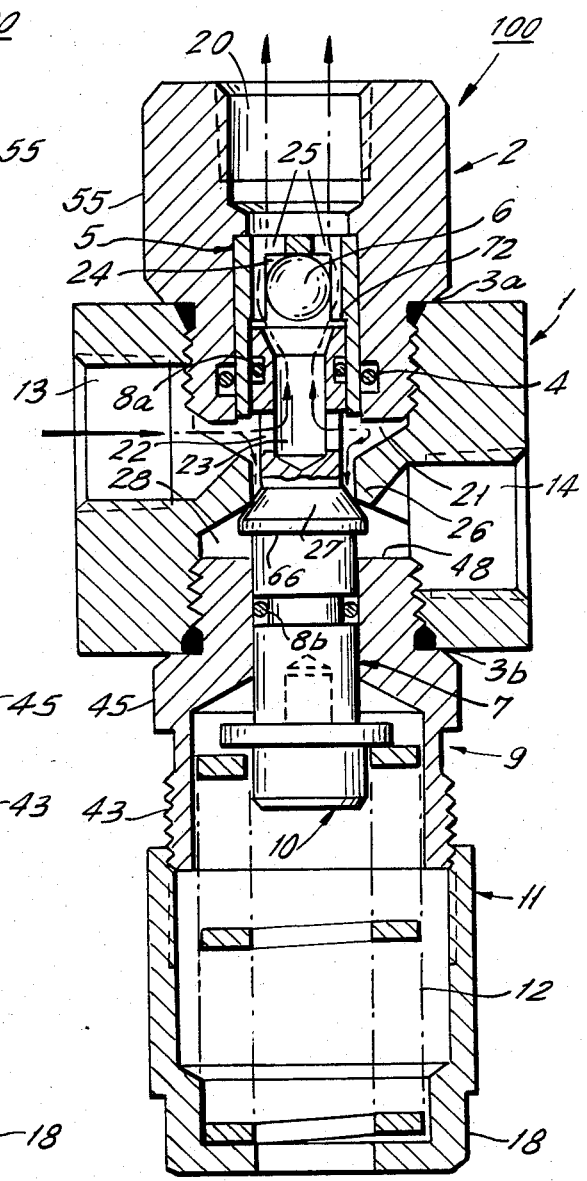
FIG. 2A is a cross-sectional view of the unloader valve, taken in the direction of the arrows 2—2 of FIG. 1.

FIGS. 1 and 2A together show the structure of the preferred embodiment of the present invention. As discussed below, FIGS. 2A and 2B also show the operation of the present invention in two different modes.

FIG. 1 shows the exterior components of the valve 100, including valve body 1, outlet fitting 2, bonnet 9, and spring adjusting nut 11. FIG. 1 also shows some of the means for tightening these components in relation to each other, including the wrench flats 55, 45, 18 formed respectively on the outlet fitting 2, bonnet 9 and spring adjusting nut 11. In addition, male threads 43 on the exterior of bonnet 9 fit into female threads in adjusting nut 11, as discussed in greater detail below. Finally, FIG. 1 shows the inlet opening 13 in the foreground and by-pass opening 14 in the background, both being made in the valve body 1. As shown in FIG. 1, these openings 13, 14 are not directly opposite each other, but are slightly displaced from each other along the length of the structure. Therefore, inlet opening 13 enters the interior of valve body 1 between outlet fitting 2 and the point where by-pass opening 14 enters the interior of valve body 1.

When viewed from the perspective of FIG. 1, the exterior of the valve 100 presents a long, relatively narrow profile. When viewed from the perspective of FIG. 2A, however, rotated 90° from FIG. 1 along its lengthwise axis, the structure presents a cross-shaped profile in which the ends of valve body 1 where inlet opening 13 and by-pass opening 14 are located, extend outwardly from the long, narrow profile of FIG. 1.

FIG. 2A shows the inner structure of the invention, and also shows the movement of fluid through the invention from inlet opening 13 to outlet opening 20, as it occurs during the pressure regulation mode of operation of the invention. FIG. 2B shows the movement of fluid from the inlet opening 13 to the by-pass opening 14, as it occurs during the unloading mode of operation. Together, FIGS. 2A and 2B illustrate how valve body 1, outlet fitting 2 and bonnet 9 together contain the fluid in a central chamber as it flows between the openings. Therefore, these components together are referred to herein as the valve body. The term "valve body" encompasses all equivalent structures providing the required openings and central chamber, however, and is not limited to the disclosed three-part construction.

As shown in FIG. 2A, fluid enters the inlet opening 13 in the valve body 1, flows into lateral chamber 21 surrounding plunger 7, enters lateral openings 22 into the hollow portion 23 of the plunger 7, flows around check valve ball 6 in cage 24 inside piston 5, and flows through exit openings 25 in piston 5 to the outlet opening 20 in the outlet fitting 2. Similarly, FIG. 2B shows how the fluid enters inlet opening 13, flows through the lateral chamber 21 to the valve seat 26, a restricted portion of the valve body 1, flows between the valve seat 26 and the conical portion 27 of plunger 7 into the by-pass chamber 28 around plunger 7, and exits through by-pass opening 14.

FIGS. 3–7A show the parts of the invention in FIG. 2A, in greater detail. The following description of each of these drawings also discloses how to make the preferred embodiment of the invention.

Valve Body

FIG. 3 shows the preferred embodiment of the valve body 1 in cross-section. Valve body 1 may be a metal member made, for example, of brass, machined to have an axial opening which includes female threaded section 30 into which outlet fitting 2 is inserted, female threaded section 31 into which bonnet 9 is inserted, lateral chamber 21 adjacent female threaded section 30, by-pass chamber 28 adjacent female threaded section 31, and valve seat 26 between lateral chamber 21 and by-pass chamber 28. In addition, bevels 33a and 33b for seals are formed where threaded sections 30 and 31, respectively, meet the outside surface of valve body 1. In the preferred embodiment, valve body 1 is made from a rectangular block, and the axial opening is at its center. Thus, the threaded sections 30, 31 can be made by machining cylindrical openings on opposite sides of the block and machining threads in those openings. The chambers 21, 28 taper linearly from the openings to a smaller diameter, which is the inner diameter of the valve seat 26. The resulting axial opening is circularly symmetrical, so that the valve seat 26 is circular.

Inlet opening 13 and by-pass opening 14 are machined so that they intersect the axial opening on opposite sides of valve seat 26. As shown in FIG. 3, each of these openings 13, 14 includes a beveled section at the outside of the block, a female threaded cylindrical section of sufficient length to penetrate the axial opening, and a linearly tapered section to permit greater flow of fluid between the openings 13, 14 and the axial opening. Each of the openings 13, 14 is circularly symmetrical, except for that portion of the cylindrical section and tapered section which intersects the axial opening.

Referring to FIG. 2A, outlet fitting 2 is inserted into female threaded portion 30, with body seal 3a in the beveled portion 33a to insure a tight seal. Similarly, bonnet 9 is inserted in female threaded portion 31 with body seal 3b in beveled portion 33b. Furthermore, to make use of the invention, fittings, not shown in the drawings, will be inserted into inlet opening 13 and by-pass opening 14. Thus, valve body 1 functions to hold the other parts of the invention and to contain the flow of fluid from inlet to outlet or to by-pass.

Bonnet

FIG. 4 shows bonnet 9 in cross-section. As with valve body 1, bonnet 9 may be a metal member made, for example, of brass and has a circularly symmetrical axial opening machined in it. Unlike valve body 1, however, bonnet 9 has a circularly symmetrical exterior which is concentric with the axial opening, so that bonnet 9 is circularly symmetrical as a whole.

In the preferred embodiment of FIG. 4, the axial opening includes wide section 40, tapering section 41 and narrow section 42. Wide section 40 has an internal diameter large enough to contain spring 12, as shown in FIG. 2A. Narrow section 42 has approximately the same internal diameter as valve seat 26 of valve body 1, and serves as a bore in which plunger 7 may slide.

In the preferred embodiment, the exterior of bonnet 9 is machined to include large male threaded section 43, thread undercut 44, wrench flats 45, seal section 46 and small male threaded section 47. Small male threaded section 47 has an outside diameter slightly larger than the female threaded portion 31 of valve body 1, so that these two components may be connected and held together by the threads. Body gasket 3b fits in the cavity between seal section 46 and bevel 33b in the valve body to provide a seal between valve body 1 and bonnet 9. The section containing wrench flats 45, which are used to tighten the bonnet 9 into the valve body 1, is of a larger outside diameter than the other exterior sections of bonnet 9. Large male threaded section 43 has an outside diameter just larger than the inside diameter of spring adjusting nut 11, so that the two components may be connected by threads.

The end surface 48 of bonnet 9 between small male threaded section 47 and narrow section 42 functions as part of the valve body means, because it forms one wall of by-pass chamber 28. In addition, end surface 48 serves as a stop for plunger travel. The remainder of bonnet 9 serves to contain spring 12, which is part of the presettable biasing means, and to connect the biasing means to the valve body means and to the movable valve means, including plunger 7.

FIG. 2A shows the structure of the biasing means connected to bonnet 9. Spring adjusting nut 11 is a circularly symmetrical component which, in the preferred embodiment, may be a machined metal member, such as brass, shaped to hold spring 12 and provided with wrench flats 18 to permit adjustment. Spring button 10, in the preferred embodiment, is also circularly symmetrical and has a pin fitting into plunger 7, and an annular flange against which spring 12 fits. Spring 12, in the preferred embodiment, is a helical spring with rectangular cross-section, as shown in FIG. 2A, and may be selected to provide whatever range of preset pressures is desired.

Outlet Fitting

FIG. 5 shows the preferred embodiment of outlet fitting 2 in cross-section. Like bonnet 9, outlet fitting 2 is circularly symmetrical, and may be a machined metal member, such as brass.

The axial opening of outlet fitting 2 includes piston bore 50 in which seal groove 51 is machined, stop section 52, tapered section 53 and female threaded section 54. The inner diameter of piston bore 50 is slightly larger than the outer diameter of piston 5, so that piston 5 may slide in the bore. Seal groove 51 is sufficiently large to hold piston seal 4, an O-ring which prevents fluid from flowing around the piston between the inlet opening 13 and the outlet opening 20. Next to the piston bore 50 is stop section 52, which has a smaller inside diameter than the outside diameter of piston 5. Therefore, it prevents piston 5 from sliding beyond the end of piston bore 50. From the stop section 52, the diameter of the axial bore increases slightly in the tapered section 53 to the diameter of female threaded section 54, which serves as the outlet opening 20 when outlet fitting 2 is installed in the valve body 1. The female threads are provided to permit connection to the desired output.

The exterior of outlet fitting 2 is machined to include male threaded section 57, seal section 56 and wrench flats 55. The outside diameter of male threaded section 57 is slightly larger than the inside diameter of female threaded portion 30 of the valve body 1, so that these two components may be connected by threads. Body seal 3a fits in seal section 56, to provide a seal when the outlet fitting 2 is connected to the valve body 1. Wrench flats 55 permit this connection to be tightened.

As with bonnet 9, the annular surface of the outlet fitting 2 between the male threaded section 57 and the piston bore 50 serves as part of the valve body means because it forms one wall of the lateral chamber 21.

Outlet fitting 2 also forms part of the valve body means be providing the outlet opening. As can be seen more clearly in FIG. 2A, when both bonnet 9 and outlet fitting 2 are connected to valve body 1, and piston 5 is resting in outlet fitting 2, the interior of the structure defines a generally cylindrical opening through the valve body means, the outside diameter of which is the diameter of the valve seat 26 and the inside diameter of piston 5. Within this generally cylindrical opening, plunger 7 is located. Thus, outlet fitting 2 also functions as a bore in which piston 5 and plunger 7 move.

Plunger

FIG. 6 shows the preferred embodiment of plunger 7 in partial cross-section. Plunger 7 is circularly symmetrical about its axis, and may be machined from a hard metal member, such as stainless steel. Because of its shape and strength, it should never break. The end of plunger 7 which fits into bonnet 9 is machined to have a cylindrical section 60, in which seal groove 61 is machined. In addition, at the center of the end, spring button hole 62 is machined, into which the spring button 10 fits. Next to cylindrical section 60 is conical portion 27, a widened portion which, together with valve seat 26 of valve body 1, forms a by-pass valve. As can be seen in FIGS. 2A and 2B, plunger 7 may move from a closed position, with conical portion 27 against valve seat 26, to a wide open position, with end surface 66 against end surface 48 of bonnet 9.

At the other end of the plunger 7, hollow portion 23 is machined by drilling a hole from the end of the plunger. In the preferred embodiment, lateral openings 22 are drilled into the hollow portion 23. At the end of the hollow portion 23, check valve seat 64 is formed by beveling the plunger 7. On the exterior of the hollow portion 23, plunger 7 is machined to include a sliding section 63 whose outside diameter is slightly smaller than the inside diameter of piston 5. Seal groove 65 is machined in the sliding section 63 to hold plunger seal 8a.

Plunger 7, together with check valve ball 6 and plunger seal 8a, forms the movable valve mechanism of the invention in one preferred embodiment. It should be noted, however, that many alternative check valve mechanisms are within the scope of the invention, including the use of a poppet or other plug instead of ball 6 and including a spring or other means for biasing the ball, poppet or other plug in the closed position. As discussed in greater detail below, the flow of fluid through the unloader valve is determined by the movement of the movable valve mechanism in relation to the valve body means.

Override Piston

FIG. 7 shows the preferred embodiment of override piston 5 in cross-section, and FIG. 7A shows an end view of the outlet end of override piston 5. Piston 5 is circularly symmetrical about its axis, and, in the preferred embodiment, is made by machining a metal member, such as brass, and then chrome plating it. Alternatively, it may be a single machined metal member.

As shown in FIG. 7, the exterior of piston 5 is cylindrical, and its diameter is slightly smaller than the inside diameter of piston bore 50 in the outlet fitting 2. On the interior of the piston, a cylindrical section 70 has an inside diameter slightly larger than the outside diameter of the sliding section 63 of plunger 7. Lip 72, which is the boundary between cylinder section 70 and cage section 71 of piston 5, engages plunger 7 when the unloader valve is shifting to unloading operation and drives plunger 7 into the position in which the by-pass valve is wide open. In the preferred embodiment, as shown in FIG. 7, the cage section 71 is made by machining a rounded cylindrical axial opening from the cylinder section into the cage section. Then, the exit openings 25, as shown in FIG. 7A, are machined from the opposite end of piston 5 but inside the inside diameter of the cylinder section 70.

Pressure Regulation Operation

In the pressure regulation mode of operation, a pump is providing fluid under pressure to inlet opening 13 and the output connected to output opening 20 is open. Therefore, the outlet pressure is determined by the compression load of bias spring 12, adjustable by nut 11.

In the pressure regulation mode of operation, the check valve is open, as shown in FIG. 2A and override piston 5, described above, remains stationary within outlet fitting 2. The outlet pressure of the unloader valve is controlled entirely by the incremental movements of plunger 7 which increase or decrease the by-pass valve opening.

FIG. 2A shows an example of the pressure regulation mode of operation in which the inlet pressure is generally above the preset pressure determined by adjusting the spring adjusting nut 11. In this mode, check valve ball 6 is away from check valve seat 64 on plunger 7, permitting fluid to flow from the hollow portion 23 of the plunger to the outlet opening 20. Also, plunger 7 moves incrementally to regulate presure, moving perhaps one-fifth of its full stroke.

The unloader valve in FIG. 2A will respond as follows to an increase in output flow. The increased flow will reduce outlet pressure exerted against the outlet end of plunger 7 below the force necessary to counteract bias spring 12. Spring 12 will move plunger 7, causing conical portion 27 to approach valve seat 26, and decreasing the flow through the by-pass valve. Conical portion 27 may momentarily meet valve seat 26, as shown. But the closing of the by-pass valve will increase flow from inlet opening 13 to outlet opening 20, thus increasing outlet pressure until it reaches the preset pressure and moves plunger 7 to open the by-pass valve.

On the other hand, a decrease in output flow will increase outlet pressure above the force sufficient to counteract spring 12. Pressure against plunger 7 will move conical portion 27 away from valve seat 26, permitting increased flow through the by-pass valve. This, in turn, will reduce flow from input opening 13 to outlet opening 20, until outlet pressure drops to the preset pressure.

The low pressure differential across plunger seal 8a and short incremental movements of plunger 7 result in low wear and consequent long life of the plunger seal 8a.

Unloading Operation

The unloading mode of operation occurs when the output is shut off. As a result of the shut-off, pressure in the outlet line moves ball 6 against check valve seat 64, as shown in FIG. 2B. This closes the check valve, locking the fluid in the outlet line at a lock-up pressure slightly greater than the inlet pressure. The pressure will also move piston 5 so that lip 72 engages the end of plunger 7.

The lock-up pressure acts on the outlet end of override piston 7 and on the exposed area of plunger 5 and check valve ball 6, an area substantially larger than the plunger end area alone. As a result, this pressure overcomes the bias spring 12, so that plunger 5, ball 6 and piston 7 move together until plunger end surface 66 meets the end surface 48 of bonnet 9, as shown in FIG. 2B. This movement also opens the by-pass valve to its fully open position, permitting fluid to flow from inlet opening 13 to by-pass opening 14, thus preventing excessive pressure build-up and dropping inlet pressure to a very low unloading level. When inlet pressure begins to drop, the pressure differential across piston 5 rises, so that the plunger 7 is moved to and held in the open position.

The unloader valve will remain in the unloading mode of operation shown in FIG. 2B until the output is reopened, because the lock-up pressure will be maintained against the piston 7, plunger 5 and ball 6. Therefore, the piston 7 and plunger 5 will be stationary with no wear on either seal.

In shifting to and from the unloading mode, piston 7 moves relative to the seal 4 and a high pressure differential across seal 4 may occur. Even though these movements are longer than the incremental movements against seal 8a, the movements are transitional and of short duration, so that wear on seal 4 is minimized.

Although most of the parts of the inventive unloader valve should never fail, seals 4, 8a and 8b may fail, and spring 12 could eventually break. Due to the novel arrangement of parts, however, none of these failures will seriously disrupt operation, as can readily be seen from the above description.

Although the present invention has been described in connection with the preferred embodiment thereof, many variations and modifications will now become apparent to those skilled in the art. It is preferred, therefore, that the present invention be limited not by the specific disclosure herein, but only by the appended claims.

What is claimed is:

1. A valve comprising:
    a valve body for containing the flow of a fluid, the valve body having a generally cylindrical central chamber; an inlet opening to the central chamber for fluid to enter the central chamber; an outlet opening to the central chamber for fluid to exit from the central chamber for providing a flow of fluid to an output; a by-pass opening to the central chamber for fluid to exit from the central chamber; the openings being disposed such that the inlet opening is between the outlet opening and the by-pass opening; the central chamber of the valve body further having a restricted portion between the inlet opening and the by-pass opening; and
    a movable valve mechanism inside the central chamber in the valve body for permitting fluid to flow from the inlet opening to the outlet opening, the movable valve mechanism comprising;
    a plunger comprising a hollow portion, the hollow portion having a lateral opening for receiving fluid from the inlet opening of the valve body and having an end opening for discharging fluid to the outlet opening; the plunger further comprising a widened portion which fits against the restricted portion of the valve body for forming a by-pass valve; and
    a check valve at the end opening of the hollow portion of the plunger for preventing the flow of fluid from the outlet opening to the inlet opening of the valve body;
    an override piston movable in relation to the plunger for driving the plunger when the output is closed for fully opening the by-pass valve and for permitting fluid to flow from the inlet opening to the by-pass opening for avoiding excessive pressure and for lowering pressure in the inlet opening to a low unloading pressure level.

2. The valve of claim 1 further comprising a first seal around said piston and in which the movable valve mechanism further comprises a second seal around the hollow portion of the plunger, the first and second seals both for preventing the flow of fluid between the outlet opening and the inlet opening of the valve body; the first and second seals being worn by different movements of the piston and the plunger for reducing wear on each seal.

3. The valve of claim 2 in which the second seal is worn only when the output is open.

4. The valve of claim 2 in which the first seal is worn only when the piston drives the plunger for fully opening the by-pass valve and when the piston moves when the by-pass valve again closes.

5. The valve of claim 1 in which the piston has a hollow cylindrical portion with an inner wall, the inner wall fitting around the hollow portion of the plunger.

6. The valve of claim 1 in which the piston comprises a lip for engaging the plunger in response to a lockup pressure at the outlet opening.

7. The valve of claim 6 in which the piston further has an outlet surface responsive to the lock-up pressure and an inlet surface responsive to an inlet pressure, the piston driving the plunger for opening the by-pass valve when the force from the lock-up pressure exceeds the force from the inlet pressure.

8. The valve of claim 1 in which the piston comprises a cage section around the check valve.

9. The valve of claim 8 in which the cage section comprises a surface facing the outlet opening of the valve body, the surface having exit openings for permitting the flow of fluid from the check valve to the outlet opening.

10. The valve of claim 1 in which the piston has a cylindrical outer wall and in which the valve body further comprises:
    a bore for containing the cylindrical outer wall of the piston; and
    a seal around the cylindrical outer wall of the piston for preventing the flow of fluid around the piston between the inlet opening and the outlet opening of the valve body.

11. The valve of claim 1 in which the piston and plunger are stationary with respect to the valve body when the by-pass valve is fully open.

12. The valve of claim 1 in which the piston is stationary with respect to the valve body when the output is open.

13. An unloader valve comprising:
    a valve body having an inlet opening and an outlet opening spaced from the inlet opening, and further having a cylindrical bore between the inlet and outlet openings;
    an override piston sealably fitting inside the cylindrical bore and movable in relation to the valve body;

the piston having a hollow cylindrical portion with an inner wall;

a plunger sealably fitting inside the inner wall of the piston and movable in relation to the piston for regulating pressure at the outlet opening; the plunger further being drivable by the piston to an unloading position; the plunger returning with the piston to a pressure regulating position from the unloading position;

a first seal between the piston and the cylindrical bore of the valve body, the first seal being worn only when the piston drives the plunger to the unloading position and when the plunger and piston return to the pressure regulating position;

a second seal between the plunger and the inner wall of the piston, the second seal being worn only when the plunger moves in relation to the piston for regulating pressure;

the first and second seal together preventing the flow of fluid from the inlet opening to the outlet opening around the plunger.

* * * * *